(12) United States Patent
Hoppe et al.

(10) Patent No.: US 9,080,686 B2
(45) Date of Patent: Jul. 14, 2015

(54) VALVE, PARTICULARLY GLUE VALVE

(75) Inventors: Reinhard Hoppe, Tespe (DE); Ralf Barkmann, Hamburg (DE); Stefan Harms, Hamburg (DE); Christian Schönherr, Georgsmarienhütte (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 307 days.

(21) Appl. No.: 12/597,363

(22) PCT Filed: Jun. 19, 2008

(86) PCT No.: PCT/EP2008/004933
§ 371 (c)(1),
(2), (4) Date: Oct. 23, 2009

(87) PCT Pub. No.: WO2008/155117
PCT Pub. Date: Dec. 24, 2008

(65) Prior Publication Data
US 2010/0133453 A1 Jun. 3, 2010

(30) Foreign Application Priority Data
Jun. 21, 2007 (DE) .......................... 10 2007 029 064

(51) Int. Cl.
*F16K 31/08* (2006.01)
*F16K 49/00* (2006.01)
(Continued)

(52) U.S. Cl.
CPC ............. *F16K 31/082* (2013.01); *F16K 49/005* (2013.01); *H01F 7/1615* (2013.01)

(58) Field of Classification Search
CPC ............ F16K 31/0655; F16K 31/0658; F16K 31/082; F16K 31/084; F16K 31/086; H01F 7/122; H01F 7/1615; H01F 7/1646
USPC ............ 251/65, 129.15, 129.18, 264, 129.03; 137/334, 338; 335/229–234
See application file for complete search history.

(56) References Cited

U.S. PATENT DOCUMENTS 40,939 A * 12/1863 Leitch ........................... 251/264
2,677,524 A * 5/1954 Parsons ..................... 251/129.21
(Continued)

FOREIGN PATENT DOCUMENTS

DE 3 305 833 9/1983
DE 433 2 960 A1 10/1994
(Continued)

OTHER PUBLICATIONS

International Search Report issued in corresponding International Application No. PCT/EP2008/004933 dated Oct. 17, 2008.
(Continued)

*Primary Examiner* — Craig Schneider
*Assistant Examiner* — Jonathan Waddy
(74) *Attorney, Agent, or Firm* — Laurence P. Colton; Smith Risley Tempel Santos LLC

(57) ABSTRACT

The invention relates to a valve particularly for transferring small portions of glue onto folding tabs of (cigarette) packs. A closing element (15) of the valve is actuated by different elements, that is to say, is moved between the open and closed positions, on the one hand by two permanent magnets (24, 25) arranged a short distance from each other and having aligned poles such that the closing element is permanently kept in the closed position by the permanent magnets (24, 25). On the other hand, an actuating element, which is configured as an electromagnet (23), acts to move the closing element (15) into the open position in a controlled way by overcoming the closing forces. The closing element (15) is designed in a particular way, that is to say, with channels extending along the outside in the longitudinal direction for the medium or the glue.

17 Claims, 4 Drawing Sheets

(51) Int. Cl.
   *H01F 7/02*        (2006.01)
   *H01F 7/16*        (2006.01)

(56) References Cited

U.S. PATENT DOCUMENTS

| | | | | |
|---|---|---|---|---|
| 2,987,293 | A * | 6/1961 | Knudson | 251/129.07 |
| 3,105,511 | A * | 10/1963 | Murphy, Jr. | 137/399 |
| 3,233,625 | A * | 2/1966 | Pase | 137/416 |
| 3,368,788 | A * | 2/1968 | Padula | 251/65 |
| 3,561,466 | A * | 2/1971 | Carden | 137/102 |
| 3,738,578 | A * | 6/1973 | Farrell | 239/585.4 |
| 4,207,912 | A * | 6/1980 | Ichikawa | 137/39 |
| 4,405,160 | A * | 9/1983 | Tyuuman | 285/39 |
| 4,532,951 | A * | 8/1985 | Fermanich | 137/84 |
| 4,630,799 | A | 12/1986 | Nolan et al. | |
| 4,714,193 | A | 12/1987 | Yogo | |
| 4,742,964 | A * | 5/1988 | Ito et al. | 239/397.5 |
| 4,890,815 | A * | 1/1990 | Hascher-Reichl et al. | 251/129.15 |
| 4,951,917 | A * | 8/1990 | Faulkner, III | 251/129.15 |
| 5,029,807 | A * | 7/1991 | Fuchs | 251/65 |
| 5,169,117 | A * | 12/1992 | Huang | 251/30.03 |
| 5,445,184 | A * | 8/1995 | Racine et al. | 137/460 |
| 5,535,919 | A * | 7/1996 | Ganzer et al. | 222/1 |
| 5,622,351 | A * | 4/1997 | Kim | 251/30.03 |
| 5,875,922 | A * | 3/1999 | Chastine et al. | 222/1 |
| 5,878,779 | A * | 3/1999 | Bircann et al. | 137/554 |
| 6,040,752 | A * | 3/2000 | Fisher | 335/234 |
| 6,068,010 | A * | 5/2000 | Reinicke | 137/1 |
| 6,073,904 | A * | 6/2000 | Diller et al. | 251/30.03 |
| 6,305,583 | B1 * | 10/2001 | Ward et al. | 222/504 |
| 6,470,905 | B2 * | 10/2002 | Im et al. | 137/45 |
| 6,994,234 | B2 * | 2/2006 | de Leeuw | 222/504 |
| 7,525,404 | B2 * | 4/2009 | Larimore et al. | 335/278 |
| 2004/0195278 | A1 | 10/2004 | Leeuw | |
| 2006/0038644 | A1 * | 2/2006 | Larimore et al. | 335/220 |
| 2006/0169935 | A1 * | 8/2006 | Yajima | 251/65 |
| 2008/0029506 | A1 * | 2/2008 | Neal | 219/628 |
| 2008/0223459 | A1 * | 9/2008 | Walpole et al. | 137/528 |

FOREIGN PATENT DOCUMENTS

| | | |
|---|---|---|
| DE | 196 32 162 A1 | 12/1997 |
| DE | 297 07 905 U1 | 8/1998 |
| EP | 0 719 592 A | 7/1996 |
| EP | 0719592 A | 7/1996 |
| EP | 1 277 694 A | 1/2003 |
| EP | 1277694 A | 1/2003 |
| JP | S57-026813 U | 2/1982 |
| JP | S62-110087 A | 5/1987 |
| JP | S62-170464 U | 10/1987 |
| JP | S63-033073 U | 3/1988 |
| JP | H08-138932 A | 5/1996 |
| JP | H08-252487 A | 10/1996 |
| JP | H10-306712 A | 11/1998 |
| JP | 2002-174356 A | 6/2002 |

OTHER PUBLICATIONS

German Search Report issued in corresponding German Application No. 10 2007 029 064.2 dated Oct. 25, 2007.
European Patent Office office action citing the patents listed in this IDS (Feb. 24, 2012).

* cited by examiner

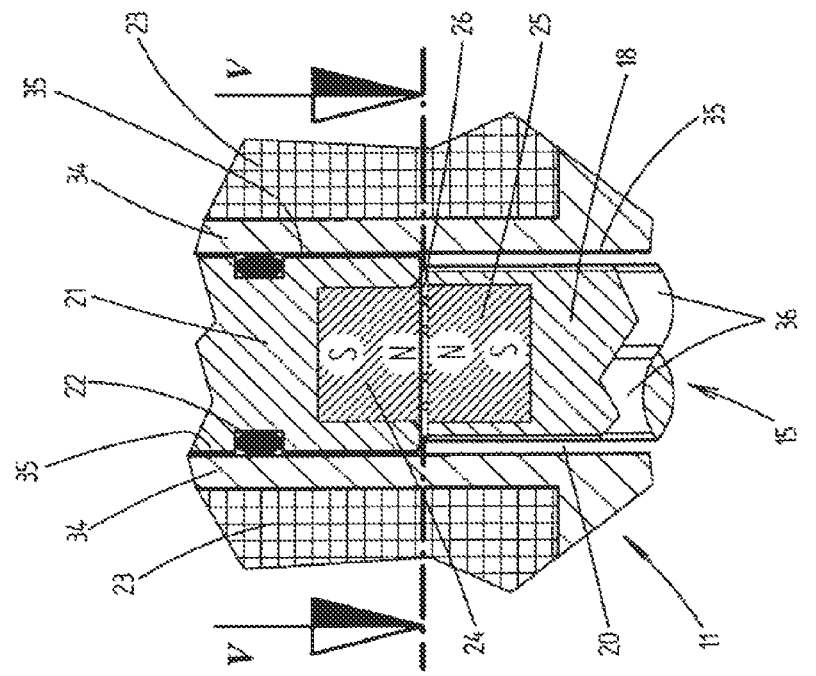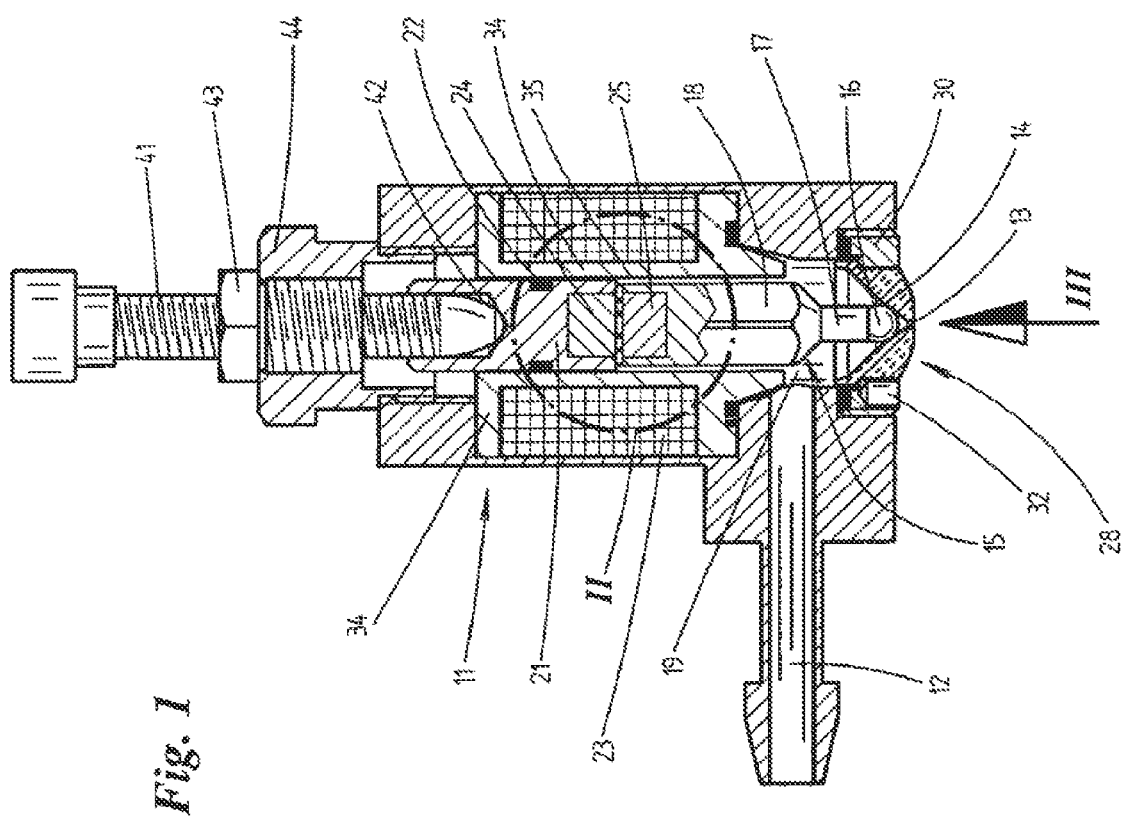

VALVE, PARTICULARLY GLUE VALVE

STATEMENT OF RELATED APPLICATIONS

This patent application claims the benefit of Patent Cooperation Treaty International Application No. PCT/EP2008/004933 having an International Filing Date of 19 Jun. 2008, which claims priority on German Patent Application No. 10 2007 029 064.2 having a filing date of 21 Jun. 2007, both of which are incorporated herein in their entireties by this reference.

BACKGROUND OF THE INVENTION

1. Technical Field

The invention relates to a valve for fluid media, particularly a glue nozzle or glue valve, having a valve housing, a discharge or valve opening, and a closure element which is movable within the valve housing and which, with an end-sided closing piece, when the valve or nozzle is closed, is held in sealing contact against a valve seat or nozzle seat, wherein the closure element can be moved within the valve housing by an actuating means, in particular by an electromagnet, into an opening position and by permanent magnets into a closing position, and the magnetic force or magnetic field strength which acts in the closing position of the closure element is weaker than the opening force of the actuating means which acts upon the closure element.

2. Prior Art

Glue nozzles or glue valves are geared to dispensing small portions of glue at a very high cycle rate. In a known glue nozzle, an elongated closure element with cone-shaped closing piece can be moved within the valve housing by an electromagnet into an opening position and by a helical spring into the closing position respectively (EP 0 719 592 A2). In the event of a long operating period and a high number of cycles of opening and closing motions, the closing element configured as a preloaded spring is unsatisfactory.

BRIEF SUMMARY OF THE INVENTION

The object of the invention is to propose a valve or a nozzle, in particular for the transfer of glue portions, that is designed for a long working life combined with high cycle rates and, moreover, is capable of delivering very exact, small (glue) portions.

For the achievement of this object, the valve according to the invention is characterized by the following features:
a) a first permanent magnet is arranged within the valve housing on a fixed support and a second permanent magnet is arranged opposite thereto, and with aligned magnetic pole, on the closure element,
b) the permanent magnets configured with somewhat smaller transverse dimensions are embedded in the support on the one hand and in the closure element on the one hand, such that the aligned magnetic poles of the two permanent magnets are facing each other.

The valve according to the invention is hence configured such that a motional cycle of the closure element is realized by the interaction of two permanent magnets, to be precise particularly a closing motion. For opening, a suitable actuating element, particularly an electromagnet, acts counter thereto.

A further particularity consists in the fact that the closure element in the opening position is held in contact against a fixed stop part of the valve or valve housing, spacers ensuring that the elements or permanent magnets are spaced at a short distance apart for the protection of the mutually facing permanent magnets.

The closure element is specially configured. An elongated closure body, in particular in a substantially cylindrical construction, has on the periphery longitudinally running depressions, channels or the like, which allow the passage of the medium, in particular the glue, along the shell surface of the closure body. Projections or ribs of the closure body serve to bear against an, in particular, cylindrical inner face of the valve housing. The spacers are also preferably arranged on the closure body.

A further particularity is the configuration of the valve seat. This consists of a mount, in particular of metal or stainless steel, detachably inserted, in the housing, and a nozzle body, of particularly hard-wearing material, in particular, ceramic, inserted in this mount. This nozzle insert is preferably connected to the mount by gluing.

BRIEF DESCRIPTION OF THE DRAWINGS

Further features and particularities of the valve according to the invention are explained in greater detail below with reference to the description of illustrative embodiments, wherein FIG. 1 shows a (glue) valve in vertical section, FIG. 2 shows a detailed feature II of the valve according to FIG. 1 on an enlarged scale.

DETAILED DESCRIPTION OF PREFERRED EMBODIMENTS

Figure 3:
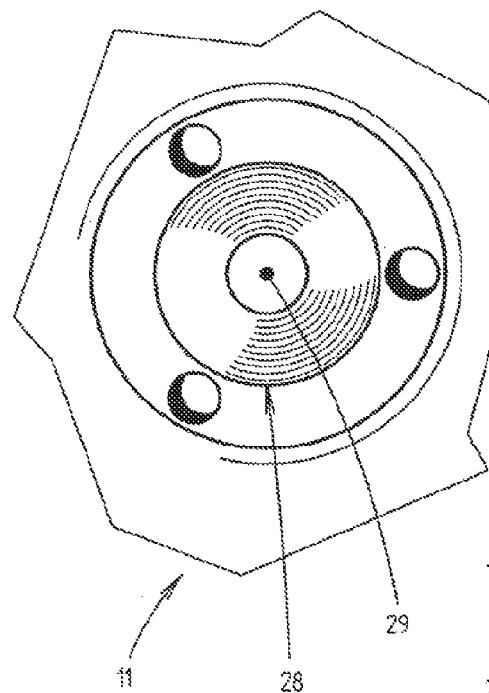
FIG. 3 shows the valve according to FIG. 1 in a view according to the arrow III, on an enlarged scale.

The shown illustrative embodiments relate to a valve or a nozzle for flowing media. This is primarily used as a glue valve in packaging technology for transferring small portions or spots of glue onto support material, in particular onto folding tabs of cigarette packs.

The glue valve consists of a valve housing 11, to which the medium, i.e. glue, can be fed via a glue line 12. The glue portions are discharged from a (lower) valve opening 13 or nozzle opening, which is delimited by a conical or cone-shaped valve seat 14. Interacting with the latter is a movable closure element 15, which is provided with a closing body facing the valve seat 14 or the valve opening 13, or with a spherical closing piece 16. This is held in sealing contact against the conical valve seat 14 when the valve opening 13 is closed. The closing piece 16 is connected by an intermediate piece 17 to a plunger piece 18 as part of the closure element 15. The plunger piece 18, and thus the closure element 15 as a whole, can be moved back within the valve housing 11 in the direction of the valve seat 14. Above the valve seat 14 a valve chamber 19 is formed, into which the glue line 12 emerges and from which, when the valve is open, glue is discharged via the valve opening 13.

The valve housing 11 is provided with a continuous inner space 20, which on the side opposite to the valve opening 13 is open and is round in cross section. Said inner space is closed off by a closure piece 21, which is arranged adjustably in a fixed position within the valve housing 11. The closure piece 21 serves, at the same time, as a stop for the closure element 15, which latter can be moved to and fro (out and down).

The closure element 15 can be moved by a closing element into a closing position and by an actuating element into an opening position. The closing element is preferably constantly active, so that the closing position of the valve or of the closing piece 16 is the normal setting. The return element for moving the closure element 15 into the opening position is an electromagnet 23, which surrounds the closure element 15 at least in a part-region. The metallic plunger piece 18 of magnetizable metal acts within a coil of the electromagnet 23 as its core. When current is supplied, a magnetic force is hence transmitted to the plunger piece 18 and thereby moves the closure element 15 as a whole into the opening position.

The closure element 15 is preferably permanently urged in the direction of closing by a closing means. This is configured as a permanent magnet, which applies a permanent magnetic force to the closure element 15 for the purpose of a closing motion. The permanent magnet consists of two single magnets 24, 25, of which one is fixedly attached to the valve housing 11 and the other to the closure element 15. In the present case, a single magnet 24 is attached to the end region of the closure piece 21, to be precise in the region of an end face which faces the plunger piece 18. The single magnet 24 is seated in a recess or depression in the end region of the closure piece 21, to be precise slightly set back from the end face or front face of the closure piece 21. The single magnet 24 is thereby protected (FIG. 2).

Analogously, the other single magnet 25 is attached to the (upper) end of the closure element 15 or of the plunger piece 18, or is embedded in a corresponding recess. The single magnets 24, 25 are hence spaced at a (short) distance apart, even when the glue valve is open. The stroke motions of the closure element 15 lie within a limited range from 0.2 mm to 0.8 mm, in particular in a range from 0.2 to 0.5 mm. An optimal stroke length is 0.3 mm.

The mutually adjacent permanent single magnets 24, 25 are positioned such that the same poles are facing each other, for example the North poles (FIG. 2). A repulsive force is thereby transmitted by the permanent single magnets 24, 25 to the closure element 15, so that this is urged in the closing position. The opening motion by the electromagnet 23 overcomes this permanent closing force.

The electromagnet 23 or its winding is arranged in an insert 28, which in vertical or axial section forms a U-shaped, circumferential recess for the winding of the electromagnet 23. The insert forms a cylindrical part of the valve chamber 19. The electromagnet 23 extends in a region such that the two single magnets 24, 25 and a part-region of the closure element 15 are also embraced.

The closure element 15 is specially configured. The plunger piece 18 is tailored to the shape and dimension of the inner space or of the valve chamber 19 in the region of a cylindrical guide part 34. The closure element 15 is configured such that, between it and a (cylindrical) inner face 35 of the valve housing 11, defined spaces for the passage of medium, in particular glue, are formed. The glue can hence enter into the region between the closure element 15 and the valve housing 11 or guide part 34, as far as the closure piece 21. For this purpose, channels, grooves or similar flow paths for the medium are formed on the periphery of the closure element 15 in the region of the plunger piece 18. In the preferred illustrative embodiment, flow channels 36 are formed all the way round and with even distribution. These extend over the full length of the plunger piece 18, i.e. as far as an end face which faces the closure piece 21. Between the several flow channels, supporting or guide elements, in particular rib-like projections 37, are formed, which effect a guidance or contact of the closure element 18 against the inner wall of the valve housing 11, so that the closure element 15 is exactly centered within the cylindrical part of the valve housing 11.

Figure 4:
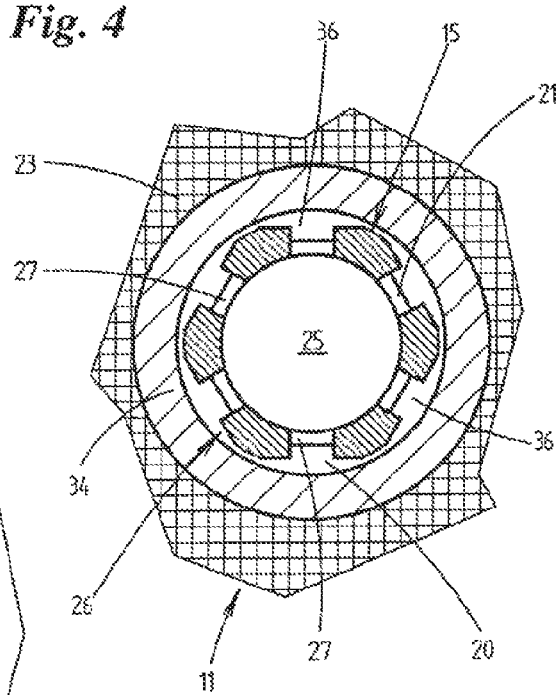
FIG. 4 shows a detail of the valve in horizontal section, likewise enlarged.
Figure 5:
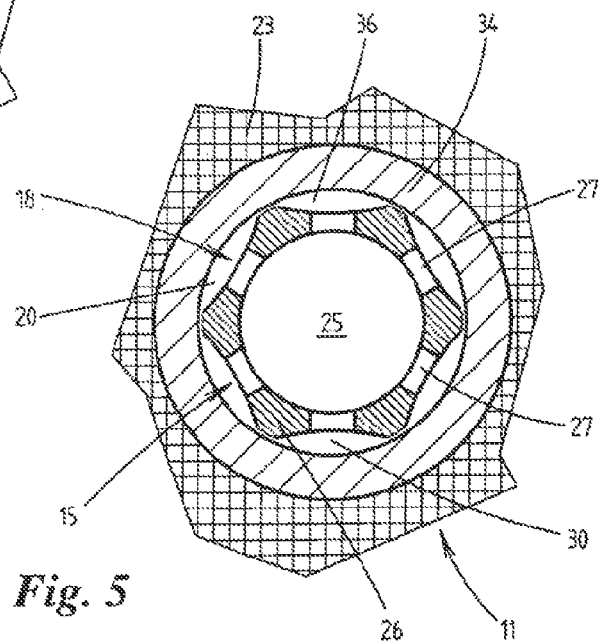
FIG. 5 shows a representation, analogous to FIG. 4, of the illustrative embodiment according to FIG. 2 in the sectional plane V-V.

In the illustrative embodiment according to FIG. 4, the laterally directed rib-like projections 37 are polygonally configured, having a central supporting surface. The flow channels 36 which are thereby formed or delimited are correspondingly polygonally configured on the inner side. In the illustrative embodiment according to FIG. 5, the flow channels 36, in cross-section, are of trough-like configuration, so that, all in all, a lenticular cross section between closure element 15 and guide part 34 is formed.

Spacers serve to ensure that the single magnets 24, 25 are always spaced apart, to be precise even in the opening position of the closure element 15. The single magnets 24, 25 with lesser diameter than the respective support, namely than the closure piece 21 on the one hand and the closure element 15 on the other hand. The spacers are arranged in a region outside the free faces of the single magnets 24, 25. In the present illustrative embodiment, one of the parts, in this case the movable closure element 15, has a distancing ring 26 fitted thereto, which has transversely or radially directed apertures 27 or recesses for the passage of the medium. The apertures 27 are delimited by projections, which are formed by the spacers arranged distributed all the way round. The apertures 27 are located in the region of the flow channels 36 of the closure element 15.

One particularity is the configuration of the valve seat 14. The valve seat 14 consists of an insert 28 of high-strength material, in particular of ceramic. In the insert at least one nozzle opening, in the present case a central nozzle opening 13, is provided. On the side facing the closing piece 16, a funnel-shaped depression in the insert 28 leads to the nozzle opening 29.

The insert 28 is connected to a holder, namely a holding ring 30, in particular of metal, namely of special steel. The insert 28 is fixed in the holding ring 30, in particular connected to the latter by gluing. The holding ring 30 is, for its part, detachably fitted to the valve housing 11, in the present example by means of a thread 31. On the free side of the holding ring 30, recesses, namely blind holes 32, are made, which to enable a tool to be applied for the introduction or release of the holding ring 30 in the counterthreaded valve housing 11.

Figure 6:
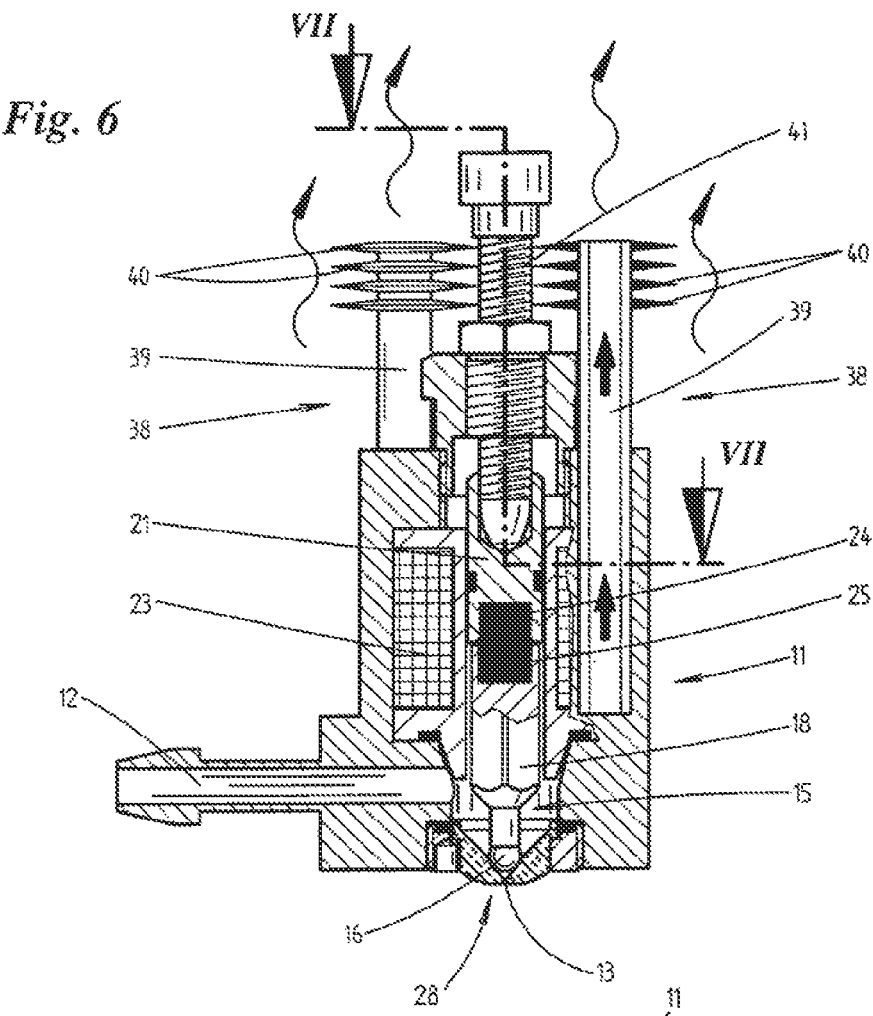
FIG. 6 shows a representation of the valve, analogous to FIG. 1, with additional elements.
Figure 7:
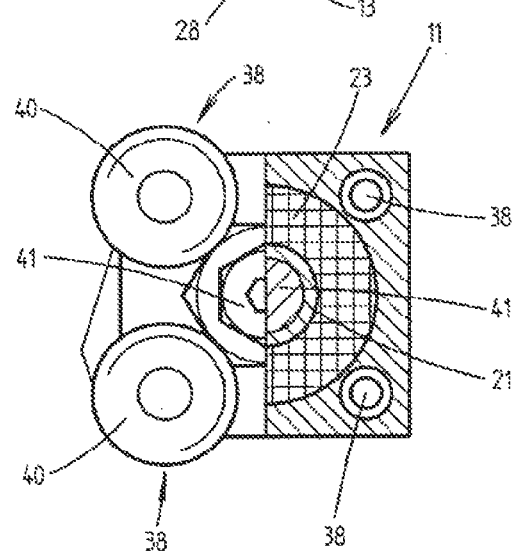
FIG. 7 shows the illustrative embodiment according to FIG. 6 in a sectional plane or top view VII-VII according to FIG. 6.
Figure 8:
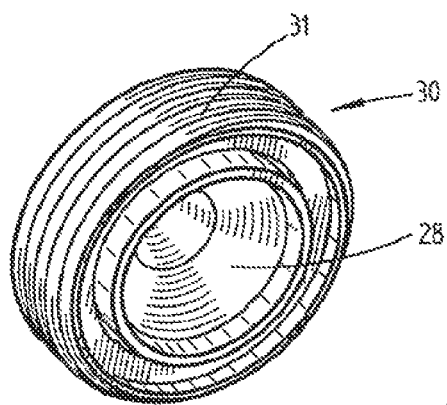
FIG. 8 shows a detail of the valve in perspective representation, namely a nozzle insert.
Figure 10:
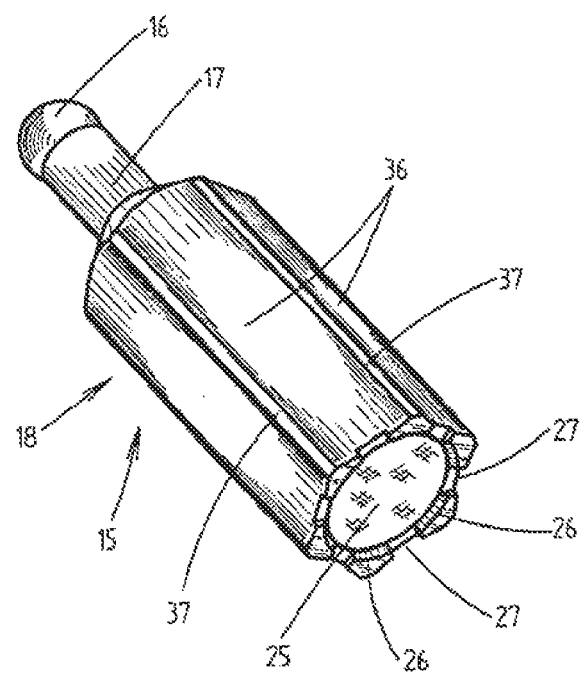
FIG. 10 shows a closure element as a detail of the valve, in perspective.
Figure 9:
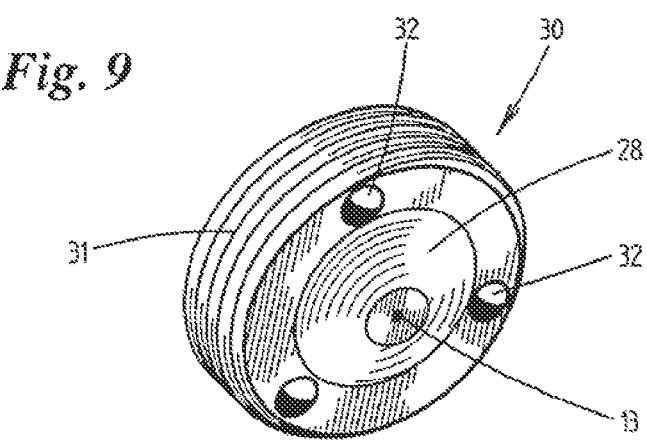
FIG. 9 shows the detail according to FIG. 8 in a another view, likewise in perspective.

A further particularity of the valve of any chosen embodiment is the cooling of the valve housing 11. According to FIG. 6, FIG. 7, an automatically working cooling is installed, to be precise by the fitting of cooling pipes, so-called heat pipes 38, on the valve housing 11 or in the valve housing 11. The heat pipes 38 are embedded in the valve housing 11 outside the region of the electromagnet 23 or outside the winding of the same. In a valve housing 11 of square cross section (FIG. 7), four heat pipes 38 are arranged at the corners of the valve housing 11. The heat pipes 38 extend at least over the full height of the windings of the electromagnet 23. An upper pipe section 39 projects from the valve housing 11. In this part, each heat pipe 38 is provided with transversely directed fins 40 for dispersing the heat to the environment. The heat pipes 38 automatically cause the heat to be dispersed by flow to the free, open, upper end.

The closure piece 21 is specially positioned (adjustably) in the valve housing 11. The closure piece 21 is disposed as a cylindrical piece in fitting arrangement in the cylindrical part of the valve chamber 19. Attached to the closure piece 21 is an adjusting element for adjusting the position of the closure piece 21, here in the form of an adjusting screw 41. This is connected to a free end part of the closure piece 21, and enters namely with a free end into an axial recess 42. In said axial recess, the end of the adjusting screw 41 is anchored, in particular by a (metal) adhesive. The fixed support is held adjustably in the valve housing 11 by the adjusting screw 41 that protrudes from the valve housing 11, and wherein the adjusting screw 41 is connected to the fixed support by entry and press fitting and/or gluing of a free end of the adjusting screw 41 into an axial recess 42 of the fixed support. On the threaded adjusting screw 41, an adjusting nut 43 is arranged, which sits with an internal thread on the adjusting screw 41 and is anchored with an external thread in a head 44 of the valve housing 11. The head 44 is fixedly connected to the valve housing 11, likewise by means of a thread. Through turning of the adjusting screw 41, this is altered in height, with corresponding displacement of the closure piece 21.

| Reference symbol list | |
|---|---|
| 11 | valve housing |
| 12 | glue line |
| 13 | valve opening |
| 14 | valve seat |
| 15 | closure element |
| 16 | closing piece |
| 17 | intermediate piece |
| 18 | plunger piece |
| 19 | valve chamber |
| 20 | inner space |
| 21 | closure piece |
| 22 | seal |
| 23 | electromagnet |
| 24 | single magnet |
| 25 | single magnet |
| 26 | distancing piece |
| 27 | aperture |
| 28 | insert |
| 30 | holding ring |
| 31 | thread |
| 32 | blind hole |
| 34 | guide part |
| 35 | inner face |
| 36 | flow channel |
| 37 | projection |
| 38 | heat pipe |
| 39 | pipe section |
| 40 | fins |
| 41 | adjusting screw |
| 42 | recess |
| 43 | adjusting nut |
| 44 | head |

The invention claimed is:

1. A valve for fluid media having a valve housing (11), a discharge or valve opening (13), and a closure element (15) which is movable within the valve housing (11) and which, with an end-sided closing piece (16), when the valve is closed, is held in sealing contact with a valve seat (14), the improvement comprising:

a) permanent magnets (24, 25), wherein the closure element (15) is movable in a closing direction into a closing position within the valve housing (11) by a repelling force between the permanent magnets (24, 25) and is urgable into the closing position by the repelling force of the permanent magnets (24, 25) acting in the closing direction so that the closing position of the valve is the normal setting;

b) an electromagnet (23), wherein the closure element (15) is movable in an opening direction into an opening position within the valve housing (11) by the electromagnet (23) having an opening force in the opening direction that overcomes the repelling force of the permanent magnets (24, 25), and wherein the repelling force that acts between the permanent magnets (24, 25) in the closing position of the closure element (15) is weaker than the opening force of the electromagnet (23) that acts upon the closure element (15); and c) a first permanent magnet (24) of the permanent magnets (24, 25) being arranged within the valve housing (11) embedded in a fixed support arranged in an inner space (20) of the housing (11) and a second permanent magnet (25) of the permanent magnets (24, 25) being arranged opposite to the first permanent magnet (24) and embedded in the closure element (15), such that the same magnetic poles of the permanent magnets (24, 25) are facing each other and the permanent magnets (24, 25) therefore repel each other, wherein the fixed support is held adjustably in the valve housing (11) by an adjusting screw (41) that protrudes from the valve housing (11), and wherein the adjusting screw (41) is connected to the fixed support by entry and press fitting and/or gluing of a free end of the adjusting screw (41) into an axial recess (42) of the fixed support.

2. A valve for fluid media having a valve housing (11), a discharge or valve opening (13), and a closure element (15) which is movable within the valve housing (11) and which, with an end-sided closing piece (16), when the valve is closed, is held in sealing contact with a valve seat (14), the improvement comprising:

a) permanent magnets (24, 25), wherein the closure element (15) is movable in a closing direction into a closing position within the valve housing (11) by a repelling force between the permanent magnets (24, 25) and is urgable into the closing position by the repelling force of the permanent magnets (24, 25) acting in the closing direction so that the closing position of the valve is the normal setting;

b) an electromagnet (23), wherein the closure element (15) is movable in an opening direction into an opening position within the valve housing (11) by the electromagnet (23) having an opening force in the opening direction that overcomes the repelling force of the permanent magnets (24, 25), and wherein the repelling force that acts between the permanent magnets (24, 25) in the closing position of the closure element (15) is weaker than the opening force of the electromagnet (23) that acts upon the closure element (15);

c) a first permanent magnet (24) of the permanent magnets (24, 25) being arranged within the valve housing (11) embedded in a fixed support arranged in an inner space (20) of the housing (11) and a second permanent magnet (25) of the permanent magnets (24, 25) being arranged opposite to the first permanent magnet (24) and embedded in the closure element (15), such that the same magnetic poles of the permanent magnets (24, 25) are facing each other and the permanent magnets (24, 25) therefore repel each other; and d) cooling means arranged within the valve housing (11), the cooling means being upright heat pipes (38) and being arranged in the valve housing (11) such that a discharge opening of the cooling means is exposed, wherein the fixed support is held adjustably in the valve housing (11) by an adjusting screw (41) that protrudes from the valve housing (11), and wherein the adjusting screw (41) is connected to the fixed support.

3. The valve as claimed in claim 2, wherein the closure element (15) is an elongated cylinder having on an outer periphery longitudinally running channels (36) with web-shaped or rib-shaped projections (37) respectively located between a plurality of the channels (36), the projections (37) respectively located between the plurality of the channels (36) serving for the support of the closure element (15) on an inner face (35) of the valve housing (11).

4. The valve as claimed in claim 3, further comprising:
e) the fixed support serving as a stop for the closure element (15) in the opening position;
f) the first permanent magnet (24) having smaller transverse dimensions than the fixed support;
g) the second permanent magnet (25) having smaller transverse dimensions than the closure element (15);
h) spacers, wherein the permanent magnets (24, 25), when the closure element (15) is in a position withdrawn from the valve seat (14), are fixed at a distance apart from one another by the spacers for the purpose of protecting the permanent magnets (24, 25), the spacers being distributed along an end surface of the closure element (15) about a periphery of the closure element (15), and the spacers being arranged outside of the region of the second permanent magnet (25) of the closure element (15); and
i) a distancing piece (26) arranged on the closure element (15), the distancing piece (26) comprising projections and interruptions, wherein the spacers are formed by the projections comprising the distancing piece, which delimit the interruptions on the distancing piece (26) when arranged on the closure element (15), and wherein the interruptions are radially directed apertures (27) on the distancing piece (26), the interruptions serving for the throughflow of the fluid media.

5. The valve as claimed in claim 2, wherein the valve housing (11) has a rectangular or square cross section, and the heat pipes (38) are arranged respectively in the region of corners of the valve housing (11).

6. The valve as claimed in claim 5, wherein the heat pipes (38) are tubular and a free pipe section (39) of the heat pipes (38) projects from a top side of the valve housing (11), and further comprising transversely directed fins (40) fitted in the region of the pipe section (39) for dispersion of heat from the heat pipes (38).

7. The valve as claimed in claim 6, further comprising:
e) the fixed support serving as a stop for the closure element (15) in the opening position;
f) the first permanent magnet (24) having smaller transverse dimensions than the fixed support;
g) the second permanent magnet (25) having smaller transverse dimensions than the closure element (15);
h) spacers, wherein the permanent magnets (24, 25), when the closure element (15) is in a position withdrawn from the valve seat (14), are fixed at a distance apart from one another by the spacers for the purpose of protecting the permanent magnets (24, 25), the spacers being distributed along an end surface of the closure element (15) about a periphery of the closure element (15), and the spacers being arranged outside of the region of the second permanent magnet (25) of the closure element (15); and
i) a distancing piece (26) arranged on the closure element (15), the distancing piece (26) comprising projections and interruptions, wherein the spacers are formed by the projections, which delimit the interruptions on the distancing piece (26) when arranged on the closure element (15), and wherein the interruptions are radially directed apertures (27) on the distancing piece (26), the interruptions serving for the throughflow of the fluid media.

8. The valve as claimed in claim 5, further comprising:
e) the fixed support serving as a stop for the closure element (15) in the opening position;
f) the first permanent magnet (24) having smaller transverse dimensions than the fixed support;
g) the second permanent magnet (25) having smaller transverse dimensions than the closure element (15);
h) spacers, wherein the permanent magnets (24, 25), when the closure element (15) is in a position withdrawn from the valve seat (14), are fixed at a distance apart from one another by the spacers for the purpose of protecting the permanent magnets (24, 25), the spacers being distributed along an end surface of the closure element (15) about a periphery of the closure element (15), and the spacers being arranged outside of the region of the second permanent magnet (25) of the closure element (15); and
i) a distancing piece (26) arranged on the closure element (15), the distancing piece (26) comprising projections and interruptions, wherein the spacers are formed by the projections, which delimit the interruptions on the distancing piece (26) when arranged on the closure element (15), and wherein the interruptions are radially directed apertures (27) on the distancing piece (26), the interruptions serving for the throughflow of the fluid media.

9. The valve as claimed in claim 2, further comprising:
e) the fixed support serving as a stop for the closure element (15) in the opening position;
f) the first permanent magnet (24) having smaller transverse dimensions than the fixed support;
g) the second permanent magnet (25) having smaller transverse dimensions than the closure element (15);
h) spacers, wherein the permanent magnets (24, 25), when the closure element (15) is in a position withdrawn from the valve seat (14), are fixed at a distance apart from one another by the spacers for the purpose of protecting the permanent magnets (24, 25), the spacers being distributed along an end surface of the closure element (15) about a periphery of the closure element (15), and the spacers being arranged outside of the region of the second permanent magnet (25) of the closure element (15); and
i) a distancing piece (26) arranged on the closure element (15), the distancing piece (26) comprising projections and interruptions, wherein the spacers are formed by the projections, which delimit the interruptions on the distancing piece (26) when arranged on the closure element (15), and wherein the interruptions are radially directed apertures (27) on the distancing piece (26), the interruptions serving for the throughflow of the fluid media.

10. A valve for fluid media having a valve housing (11), a discharge or valve opening (13), and a closure element (15) which is movable within the valve housing (11) and which, with an end-sided closing piece (16), when the valve is closed, is held in sealing contact with a valve seat (14), the improvement comprising:
- a) permanent magnets (24, 25), wherein the closure element (15) is movable in a closing direction into a closing position within the valve housing (11) by a repelling force between the permanent magnets (24, 25) and is urgable into the closing position by the repelling force of the permanent magnets (24, 25) acting in the closing direction so that the closing position of the valve is the normal setting;
- b) an electromagnet (23), wherein the closure element (15) is movable in an opening direction into an opening position within the valve housing (11) by the electromagnet (23) having an opening force in the opening direction that overcomes the repelling force of the permanent magnets (24, 25), and wherein the repelling force of the permanent magnets (24, 25) in the closing position of the closure element (15) is weaker than the opening force of the electromagnet (23) that acts upon the closure element (15);
- c) a first permanent magnet (24) of the permanent magnets (24, 25) being arranged within the valve housing (11) embedded in a fixed support arranged in an inner space (20) of the housing (11) and a second permanent magnet (25) of the permanent magnets (24, 25) being arranged opposite to the first permanent magnet (24) and embedded in the closure element (15), such that the same magnetic poles of the permanent magnets (24, 25) are facing each other and the permanent magnets (24, 25) therefore repel each other;
- d) the fixed support serving as a stop for the closure element (15) in the opening position;
- e) the first permanent magnet (24) having smaller transverse dimensions than the fixed support;
- f) the second permanent magnet (25) having smaller transverse dimensions than the closure element (15);
- g) spacers, wherein the permanent magnets (24, 25), when the closure element (15) is in a position withdrawn from the valve seat (14), are fixed at a distance apart from one another by the spacers for the purpose of protecting the permanent magnets (24, 25), the spacers being distributed along an end surface of the closure element (15) about a periphery of the closure element (15), and the spacers being arranged outside of the region of the second permanent magnet (25) of the closure element (15); and
- h) a distancing piece (26) arranged on the closure element (15), the distancing piece (26) comprising projections and interruptions, wherein the spacers are formed by the projections, which delimit the interruptions on the distancing piece (26) when arranged on the closure element (15), and wherein the interruptions are radially directed apertures (27) on the distancing piece (26), the interruptions serving for the throughflow of the fluid media, wherein the closure element (15) is an elongated cylinder having on an outer periphery longitudinally running channels (36) with web-shaped or rib-shaped projections (37) respectively located between a plurality of the channels (36), the projections (37) respectively located between the plurality of the channels (36) serving for the support of the closure element (15) on an inner face (35) of the valve housing (11), and wherein the fixed support is held adjustably in the valve housing (11) by an adjusting screw (41) that protrudes from the valve housing (11), and wherein the adjusting screw (41) is connected to the fixed support by entry and press fitting and/or gluing of a free end of the adjusting screw (41) into an axial recess (42) of the fixed support.

11. The valve as claimed in claim 10, further comprising cooling means arranged within the valve housing (11), the cooling means being upright heat pipes (38) and being arranged in the valve housing (11) such that a discharge opening of the cooling means is exposed.

12. The valve as claimed in claim 11, wherein the valve housing (11) has a rectangular or square cross section, and the heat pipes (38) are arranged respectively in the region of corners of the valve housing (11).

13. The valve as claimed in claim 12, wherein the heat pipes (38) are tubular and a free pipe section (39) of the heat pipes (38) projects from a top side of the valve housing (11), and further comprising transversely directed fins (40) fitted in the region of the pipe section (39) for dispersion of heat from the heat pipes (38).

14. A valve for fluid media having a valve housing (11), a discharge or valve opening (13), and a closure element (15) which is movable within the valve housing (11) and which, with an end-sided closing piece (16), when the valve is closed, is held in sealing contact with a valve seat (14), the improvement comprising:
- a) permanent magnets (24, 25), wherein the closure element (15) is movable in a closing direction into a closing position within the valve housing (11) by a repelling force between the permanent magnets (24, 25) and is urgable into the closing position by the repelling force of the permanent magnets (24, 25) acting in the closing direction so that the closing position of the valve is the normal setting;
- b) an electromagnet (23), wherein the closure element (15) is movable in an opening direction into an opening position within the valve housing (11) by the electromagnet (23) having an opening force in the opening direction that overcomes the repelling force of the permanent magnets (24, 25), and wherein the repelling force of the permanent magnets (24, 25) in the closing position of the closure element (15) is weaker than the opening force of the electromagnet (23) that acts upon the closure element (15);
- c) a first permanent magnet (24) of the permanent magnets (24, 25) being arranged within the valve housing (11) embedded in a fixed support arranged in an inner space (20) of the housing (11) and a second permanent magnet (25) of the permanent magnets (24, 25) being arranged opposite to the first permanent magnet (24) and embedded in the closure element (15), such that the same magnetic poles of the permanent magnets (24, 25) are facing each other and the permanent magnets (24, 25) therefore repel each other;
- d) the fixed support serving as a stop for the closure element (15) in the opening position;
- e) the first permanent magnet (24) having smaller transverse dimensions than the fixed support;
- f) the second permanent magnet (25) having smaller transverse dimensions than the closure element (15);
- g) spacers, wherein the permanent magnets (24, 25), when the closure element (15) is in a position withdrawn from the valve seat (14), are fixed at a distance apart from one another by the spacers for the purpose of protecting the permanent magnets (24, 25), the spacers being distributed along an end surface of the closure element (15) about a periphery of the closure element (15), and the spacers being arranged outside of the region of the second permanent magnet (25) of the closure element (15); and h) a distancing piece (26) arranged on the closure element (15), the distancing piece (26) comprising projections and interruptions, wherein the spacers are formed by the projections, which delimit the interruptions on the distancing piece (26) when arranged on the closure element (15), and wherein the interruptions are radially directed apertures (27) on the distancing piece (26), the interruptions serving for the throughflow of the fluid media, wherein the fixed support is held adjustably in the valve housing (11) by an adjusting screw (41) that protrudes from the valve housing (11), and wherein the adjusting screw (41) is connected to the fixed support by entry and press fitting and/or gluing of a free end of the adjusting screw (41) into an axial recess (42) of the fixed support.

15. The valve as claimed in claim 14, further comprising cooling means arranged within the valve housing (11), the cooling means being upright heat pipes (38) and being arranged in the valve housing (11) such that a discharge opening of the cooling means is exposed.

16. The valve as claimed in claim 15, wherein the valve housing (11) has a rectangular or square cross section, and the heat pipes (38) are arranged respectively in the region of corners of the valve housing (11).

17. The valve as claimed in claim 16, wherein the heat pipes (38) are tubular and a free pipe section (39) of the heat pipes (38) projects from a top side of the valve housing (11), and further comprising transversely directed fins (40) fitted in the region of the pipe section (39) for dispersion of heat from the heat pipes (38).

* * * * *